United States Patent [19]

Rai

[11] Patent Number: 4,831,530

[45] Date of Patent: May 16, 1989

[54] METHOD FOR DETERMINING IN-SITU FORMATION PROPERTIES

[75] Inventor: Chandra S. Rai, Tulsa, Okla.

[73] Assignee: Amoco Corporation, Chicago, Ill.

[21] Appl. No.: 67,671

[22] Filed: Jun. 26, 1987

[51] Int. Cl.$^4$ .............................................. G01V 1/28
[52] U.S. Cl. ........................................ 364/421; 73/152
[58] Field of Search .................... 73/152; 364/421, 422

[56] References Cited

U.S. PATENT DOCUMENTS

| | | | |
|---|---|---|---|
| 4,584,874 | 4/1986 | Ruhovets | 73/152 |
| 4,692,910 | 9/1987 | Sondergeld et al. | 364/421 X |
| 4,722,220 | 2/1988 | Herron | 73/152 |

OTHER PUBLICATIONS

Han, D. et al. "Effects of Porosity and clay content on wave velocities in sandstones", *Geophysics*, vol. 51, No. 11, Nov. 1986, 2093–2107.

Castagna, et al., "Relationships Between Compressional Wave and Shear-Wave Velocities in Clastic Silicate Rocks", Geophysics, vol. 50, No. 4, pp. 571–581.

*Primary Examiner*—Clark A. Jablon
*Attorney, Agent, or Firm*—Timothy D. Stanley

[57] ABSTRACT

A method for determining in-situ formation properties is provided. Through regression analyses, empirical systematic relations are obtained using measures of formation properties obtained form formation samples of at lest one reference well over a range of effective pressures and pore fluids. The formation properties are selected from the group comprising shear velocity, compressional velocity, as well as porosity and mineralogy content. Direct measurements of at least two in-situ formation properties selected from the group of shear velocity, compressional velocity, porosity and mineralogy content are obtained for an exploratory well. The empirical systematic relations of formation properties are inverted to determine estimates of the balance of the insitu formation properties selected from the group including shear wave velocity, compressional wave velocity, porosity and mineralogy content not directly measured.

12 Claims, 5 Drawing Sheets

METHOD FOR DETERMINING IN-SITU FORMATION PROPERTIES

BACKGROUND OF THE INVENTION

The present invention relates generally to a method for determining in-situ formation properties. More particularly, the present invention provides a method for estimating in-situ formation properties employing empirically derived systematics relating selected formation properties including compressional, bulk, and shear velocities with formation porosity and mineralogy content.

In the continuing search for subsurface minerals, including hydrocarbons, determination of in-situ formation properties has always been a goal of explorationists as an aid in interpreting formation lithology and pore fluid content. Until recently, numerous borehole logging techniques have been developed to directly gather information regarding in-situ formation properties of the earth adjacent the borehole. Exemplary of such techniques are borehole compensated sonic logging for determining formation compressional velocity, full wavetrain sonic logging for determining both compressional velocity and shear velocity, neutron and gravity logging for determining formation density and porosity as well as gamma-gamma and electric logging for determining density as well as porosity and lithology. More recently, others such as Castagna, J. P. et al., in "Relationships Between Compressional Wave and Shear-Wave Velocities in Clastic Silicate Rocks," Geophysics, Vol. 50, No. 4 (April 1985), pp. 571–581 have developed systematic models between compressional and shear velocities with formation properties. Castagna et al. describes relationships for general rock types (for example, clastic silicate rocks) derived from both literature and laboratory measurements for a wide variety of such rocks. Additionally, Ruhovets in U.S. Pat. No. 4,584,874 has described a method for determining porosity, clay content and mode of distribution in gas- and oil-bearing shaly sand reservoirs employing a neutron density log crossplot technique.

In the ongoing search for subsurface mineral deposits, determination of in-situ formation properties, including for example, compressional velocity $V_p$, shear velocity $V_s$, porosity $\phi$, and mineralogy content M, are of specific interest to explorationists. Indirect methods of determining in-situ formation properties are especially useful since direct measures thereof are not always obtained for every well, and in selected areas direct measures of certain formation properties cannot be obtained. For mixed lithologies such as sand/shale sequences in the sedimentary basins of the Gulf of Mexico, determination of in-situ formation properties can be especially enlightening to further evaluate potential mineral deposits. However, because both pore fluid and effective pressures can vary in such mixed lithologies, indirect methods for evaluating potential mineral deposits can produce erroneous results. In fact, there is a great paucity of measured velocity data on Gulf of Mexico formation rocks. This is especially so for the clay-rich sediments where formation shear velocities are "slow," i.e., formation shear velocities are less than compressional velocities in the borehole fluid. However, shear wave velocity measurements are of increasing importance in light of the potential for evaluating bright spots and offset dependent amplitude variations. Additionally, more and more exploration activities are being conducted in overpressured formations, and, as such, one must understand the effects of overpressuring on formation velocities.

Responsive to the ongoing need of explorationists to obtain the most information possible regarding in-situ formation properties, a novel method has been developed for estimating in-situ formation properties at a remote exploratory well employing empirically derived systematic relations of selected formation properties.

SUMMARY OF THE INVENTION

A novel method for determining in-situ formation properties is provided. Empirical systematic relations can be obtained for determining in-situ formation properties over a range of effective pressures and pore fluids through regression analysis of measures of formation properties obtained from formation samples, of at least one reference well. In particular, systematic relations can be obtained for formation velocities, porosity and mineralogy content. Employing in-situ measures of formation properties obtained from a reference well, the reliability of the empirical systematic relations in estimating in-situ measures of formation properties can be evaluated. For systematic relations having a selected degree of reliability in estimating in-situ formation properties, one can then obtain estimates of in-situ formation properties for exploratory wells. By obtaining in-situ measurements at the exploratory well of at least two formation properties selected from the group including shear velocity, compressional velocity, porosity and mineralogy content, and by inverting the systematic relations, one can obtain estimates of the balance of the in-situ formation properties at the exploratory well from the group including shear velocity, compressional velocity, and porosity and mineralogy content. For reference wells and exploratory wells in the same general sedimentary basin, reliable measures of in-situ formation properties can thus be obtained using the developed systematic relations.

The ability to obtain reliable indirect estimates of in-situ formation properties is particularly useful since direct measurements of such in-situ formation properties selected from the group including shear velocity, compressional velocity, and porosity and mineralogy content are not always possible. Moreover, previous methods for obtaining indirect measurements of in-situ formation properties were not always reliable.

DESCRIPTION OF THE PREFERRED EMBODIMENT

Figure 1:
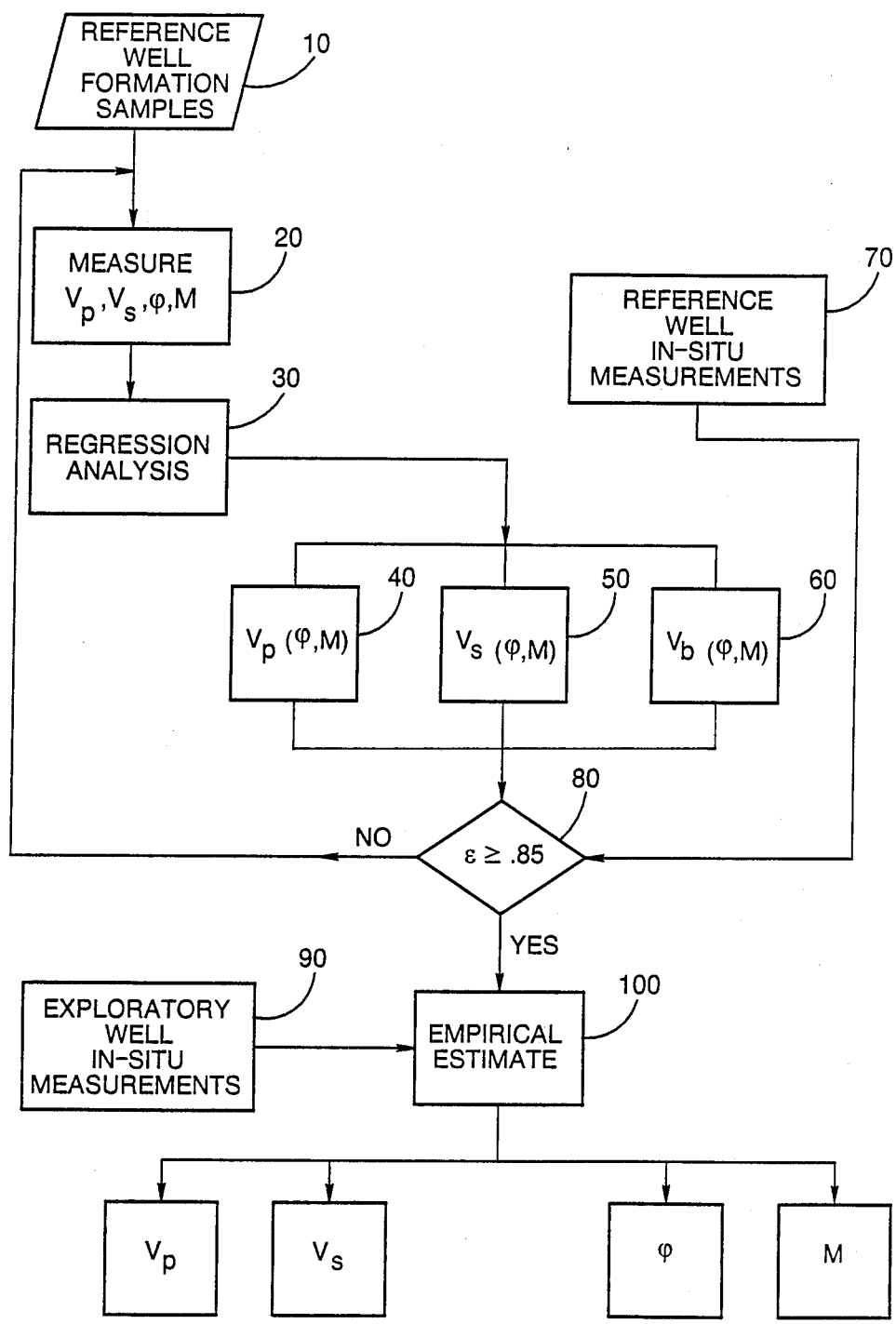
FIG. 1 is a flow diagram of the method of the present invention.

The present invention relates generally to a method for estimating in-situ formation properties. To aid in understanding the invention, the following discussion is provided.

It has been found that formation velocity variations due to the porosity and mineralogy content of sedimentary basins can generally be represented as:

$$V = V_0(1 + A_1\phi + A_2M) \qquad (1)$$

Here, $\phi$ and $M$ are the porosity and mineralogy content, respectively, of the formation, while $V_0$, $A_1$, and $A_2$ are constants to be determined. Those skilled in the art will recognize that mineralogy can include, by way of example, quartz, calcite, feldspar and clay. In the sedimentary basins of the Gulf of Mexico, for example, the major minerals present are quartz, calcite, feldspar, and clays. Petrographic examination of samples from this sedimentary basin indicates that calcite is the cementing material. The clay minerals occur as grain coatings and pore fillers, while quartz, feldspar and calcite form the rock matrix or framework. Constants ($V_0$, $A_1$ and $A_2$) in Eq. (1) can be obtained from a multiple linear regression. The input to such a regression analysis can be laboratory measured velocity data on formation samples obtained in generally the same sedimentary basin from at least one reference well in addition to laboratory measured porosity values and mineralogy content. The regression analysis can also be performed employing velocity values obtained for different effective pressures on the formation samples (for example, ranging from 1000 to 6000 psi) to simulate various depths of burial as well as different pore fluids. Of the three input parameters to such a regression analysis, velocity and porosity values can be determined with reasonable accuracies; however, mineralogy content values, although determinable with X-ray diffraction techniques, have the largest uncertainty due to the inherent limitations of the X-ray diffraction measuring technique.

As a consequence of such regression analysis, empirical systematic relations can be obtained for compressional velocity $V_p$, shear velocity $V_s$, and bulk velocity $V_b$ (a particular combination of $V_p$ and $V_s$), porosity $\phi$ and mineralogy content $M$ as follows:

$$V_p = V_0'(1 + A_1'\phi + A_2'M) \qquad (2)$$

$$V_s = V_0''(1 + A_1''\phi + A_2''M) \qquad (3)$$

$$V_b = V_0'''(1 + A_1'''\phi + A_2'''M) \qquad (4)$$

Moreover, the compressional $V_p$, shear $V_s$ and bulk $V_b$ velocities can be related according to Equation (5) below:

$$V_s = [\tfrac{3}{4}(V_p^2 - V_b^2)]^{\tfrac{1}{2}} \qquad (5)$$

The results of such multiple linear regression analysis for a number of samples from a single reference well having a wide range of porosities and clay contents over a variety of effective pressures are shown in Table 1.

TABLE 1

| Pressure (psi) | $V_0$ | $A_1$ | $A_2$ | r |
|---|---|---|---|---|
| $V_p$ | $V_0'$ | $A_1'$ | $A_2'$ | |
| 1000 | 18210 | −1.45 | −0.57 | .92 |
| 2000 | 18300 | −1.40 | −0.55 | .92 |
| 4000 | 18190 | −1.33 | −0.55 | .92 |
| 5000 | 18260 | −1.35 | −0.53 | .90 |
| 6000 | 18300 | −1.34 | −0.52 | .90 |
| $V_s$ | $V_0''$ | $A_1''$ | $A_2''$ | |
| 1000 | 10270 | −1.42 | −0.68 | .85 |
| 2000 | 10620 | −1.44 | −0.68 | .88 |
| 4000 | 10680 | −1.36 | −0.68 | .87 |
| 5000 | 10640 | −1.32 | −0.68 | .87 |
| 6000 | 10670 | −1.31 | −0.68 | .87 |
| $V_b$ | $V_0'''$ | $A_1'''$ | $A_2'''$ | |
| 1000 | 13770 | −1.46 | −0.50 | .87 |
| 2000 | 13570 | −1.37 | −0.46 | .87 |
| 4000 | 13355 | −1.32 | −0.44 | .89 |
| 5000 | 13490 | −1.37 | −0.41 | .86 |
| 6000 | 13520 | −1.36 | −0.41 | .86 |

It can be seen in Table 1 that simple linear expressions such as in Eqs. (2), (3), and (4) give a high correlation coefficient r close to 0.9 for the compressional $V_p$, bulk $V_b$, and shear $V_s$ velocities. Moreover, examination of Table 1 reveals a number of interesting features:

an increase in either the porosity $\phi$ or clay content M results in a reduction of both the compressional and shear velocities;

the influence of porosity $\phi$ on both the compressional and shear wave velocities is nearly the same;

the influence of pressure changes although noticeable is generally small;

porosity $\phi$ is two to three times more effective in reducing the formation velocity as compared to the clay content M reduction of velocity; and clay content M is more effective in reducing the shear velocity as compared to compressional velocity.

In the velocity-porosity-mineralogy systematics there are five parameters, i.e., compressional, bulk and shear velocities, as well as porosity and mineralogy content which can be related by three equations. Hence, given any two parameters, the others can be estimated. From a practical point of view, the formation properties one is most often trying to estimate are shear velocity and mineralogy content due to the difficulty in obtaining such measurements in-situ. For most wells, compressional velocity logs are available; however, shear velocity logs are generally available only in selected wells where full wavetrain sonic data has been acquired. Even in such wells, successful acquisition of shear velocity often depends on whether the formation shear velocity is greater than the acoustic velocity of the borehole fluid. In fact, due to the young age of the sedimentary basins in the offshore Gulf of Mexico, it is quite likely that the formation shear velocity will be lower than the borehole fluid velocity. With such a situation, it is desirable for the explorationist to have an estimate of the in-situ formation shear velocity from available lithological and sonic log information. Of the two lithological paramaters obtainable from logs, i.e., porosity and mineralogy content, porosity is most easily and precisely determined. To say the least, mineralogy content determination has been enigmatic.

Looking now to FIG. 1, a schematic flow diagram of the method of the present invention is provided. As a first step at 10, a plurality of formation samples is obtained from at least one reference well in a selected sedimentary basin. At step 20, laboratory measures of formation properties including measures of porosity and mineralogy content as well as shear $V_s$ and compressional $V_p$ velocities can be obtained. Additionally, measures of shear $V_s$ and compressional $V_p$ velocities can be obtained for a plurality of different pore fluids and effective pressures. Employing the laboratory measures of formation velocities, porosity, and mineralogy content at step 30, empirical systematic relations are derived through a regression analysis for selected formation properties, including compressional, shear and bulk velocities, as well as porosity and mineralogy content for a selected effective pressure and pore fluid. As used herein, mineralogy content can comprise either volume or weight percent of clay, quartz, feldspar, calcite, etc. Preferably, the regression analysis uses an equation of the form of Eq. (1) to obtain separate systematic relations at 40, 50 and 60 representing in-situ formation compressional $V_p$, shear $V_s$ and bulk $V_b$ velocities, respectively, as functions of formation porosity $\phi$ and mineralogy content M similar to Eqs. (2–4), respectively.

At step 70, at least three direct measurements of in-situ formation properties selected from the group comprising $V_p$, $V_s$, $\phi$ and M are obtained from at least one reference well. The direct measures of in-situ formation properties can be from the reference well from which the samples were obtained in step 10 or from a second reference well in the same general sedimentary basin. At step 80, a comparison of estimated in-situ formation properties obtained by employing the systematic relations of 40, 50 and 60 using any two of the three direct in-situ measurements of formation properties from the reference well are compared to the third measured in-situ formation property to determine the reliability of the systematic relations 40, 50, 60 in obtaining reliable estimates of the selected in-situ formation properties. The reliability of the systematic relations can be evaluated using a weighted ratio $\epsilon$ of estimated and measured formation properties, which gives a quantitative measure of the goodness of fit of the measured in-situ formation properties to the estimated measures of in-situ formation properties obtained from the systematic relations. As an example for correlations of the estimated and measured formation properties where $\epsilon \geq 0.85$, I have found that the systematic relations of 40, 50 and 60 can produce reliable estimates of the in-situ formation properties. For correlations where $\epsilon < 0.85$, the processing can return to step 30, whereby the steps 40–60 are repeated to obtain a different set of systematic relations for different effective pressures and pore fluid contents whereby laboratory measures of formation properties more accurately replicate the in-situ formation properties until correlations of $\epsilon \geq 0.85$ can be obtained. Consequently, one can proceed to estimate formation properties step-wise through areas of interest and determine the reliability of fit of the measured in-situ formation properties to the systematic relations. For correlations where $\epsilon \geq 0.85$ for a selected sedimentary basin, one can reliably employ the empirically determined systematic relations. Although values of $\epsilon \geq 0.85$ have been used, the systematic relations can still be effectively employed in determining in-situ formation properties for lesser values of $\epsilon$.

At step 90, at least two measures of in-situ formation properties selected from the group including $V_p$, $V_s$, $\phi$, and M are obtained for an exploratory well in the same general sedimentary basin as the reference well. At step 100, estimates of the balance of the in-situ formation properties can be obtained by inverting systematic relations of 40, 50, and 60, as appropriate. If three measures of in-situ formation properties are obtained for the exploratory well, one can increase the reliability of the balance of the estimated in-situ formation properties by employing all the measured in-situ formation properties in the empirical relations. (For example, if in-situ measures of $V_p$, $\phi$ and M are obtained, one can determine $V_b$ from Eq. (4) and $V_s$ from Eq. (5)).

Demonstrative of the present method for estimating in-situ formation properties, the following test was conducted. An initial set of empirical systematic relations for shear, compressional, and bulk velocities as well as porosity and mineralogy content were developed for a sedimentary basin of interest in the Gulf of Mexico from a single offshore reference well. A remote inland exploratory well some 300 miles from the offshore reference well was chosen for estimation of in-situ formation properties. For the remote exploratory well, full wavetrain sonic data was available, thus measurements of both compressional $V_p$ and shear $V_s$ velocities were available. Additionally, porosity $\phi$ and clay content M were determined from conventional logs.

Figure 2:
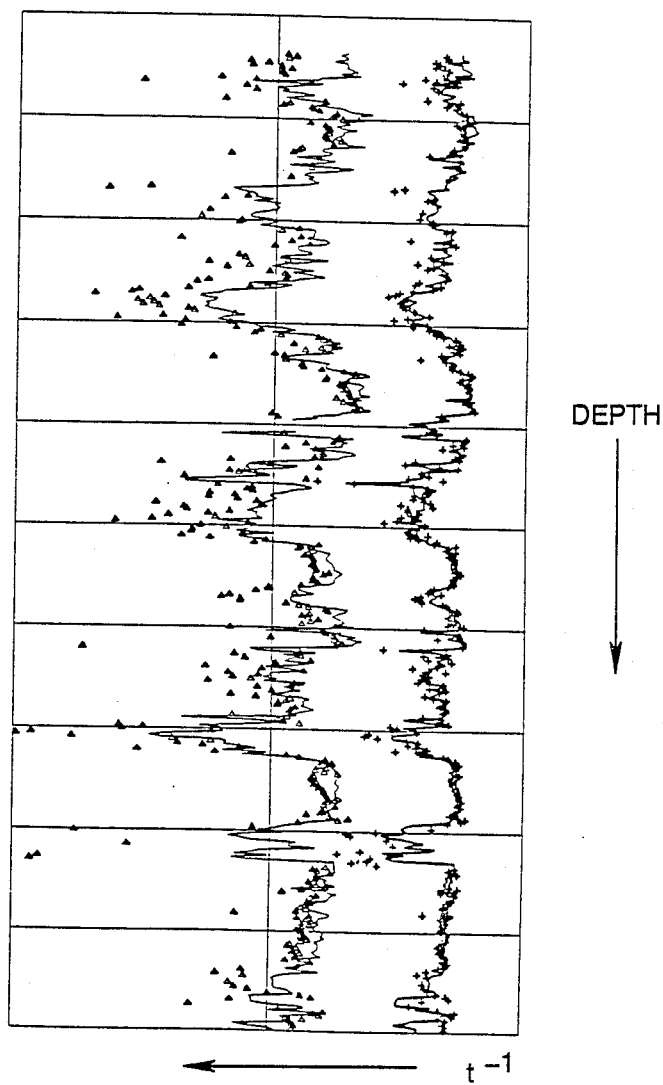
FIG. 2 is a schematic representation of a full wavetrain sonic log for a remote exploratory well with estimated shear and compressional velocity indicated thereon.

Looking now to FIG. 2, a schematic representation of a full wavetrain sonic log for the remote exploration well is shown with the transit times of the compressional P and shear S waves indicated with solid lines and the estimates of the shear S and compressional P waves transit times indicated by triangles and plus signs, respectively. It is understood in the art that transit times can be related to velocities. Using systematic relations such as Eqs. (2) and (3), the determined clay content M and porosity $\phi$ for the exploratory well were used to estimate the shear $V_s$ and compressional $V_p$ velocities. The coefficients, $V_0$, $A_1$, and $A_2$ were empirically derived for the systematic relations from formation samples of the offshore reference well some 300 miles away. The agreement with the measured transit times for compressional and shear waves is good, especially for the compressional wave transit times.

Figure 3:
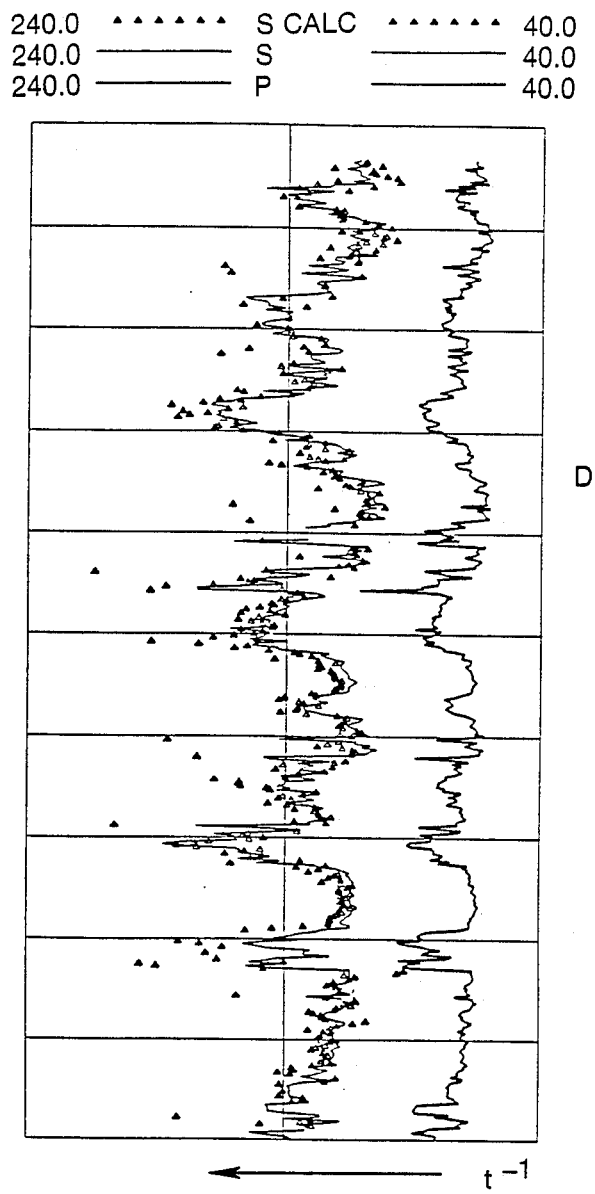
FIG. 3 is a schematic representation of the full wavetrain sonic log of FIG. 2 with improved estimates of shear velocities.

As mentioned earlier, formation compressional velocity is generally available. Hence, by including the measured compressional velocity in the estimation of shear velocity, improved estimations of in-situ formation properties can be obtained. Exemplary of such improved estimation is depicted in FIG. 3. In particular, FIG. 3 represents the full wave sonic log of FIG. 2 with the measured compressional P and shear S transit times indicated by solid lines as well as estimated shear wave transit times indicated by triangles. Quite clearly, the scatter in the estimated shear wave transit times has been reduced significantly over that in FIG. 2. The procedure used for the estimation of shear velocities was to employ the in-situ log derived porosity $\phi$ and clay content M to estimate bulk velocity $V_b$ from Eq. (4). $V_s$ can then be obtained from Eq. (5) since $V_p$ and $V_b$ are known.

Figure 4:
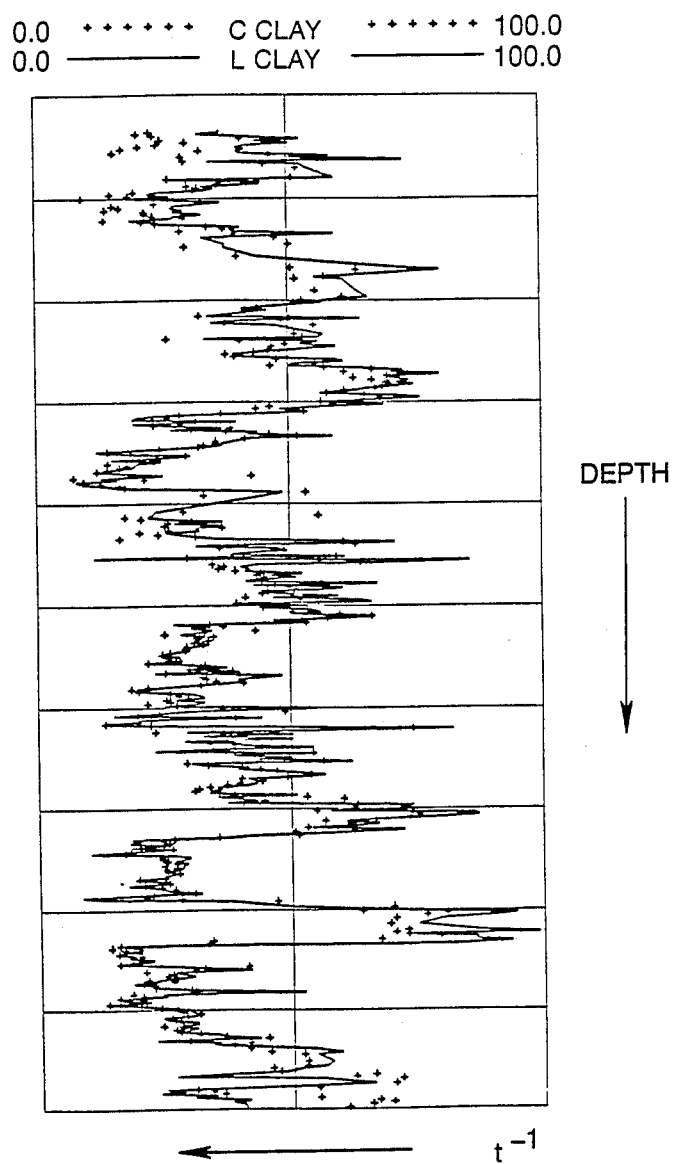
FIG. 4 is a schematic representation of estimated clay content superimposed on log-derived clay content for the remote exploratory well.

Now looking to FIG. 4, an estimate of the clay content as function of depth is depicted. Specifically, FIG. 4 represents a comparison of estimated clay content indicated with the plus symbols and log derived clay content indicated by the solid line. Knowing two empirical systematic relations relating $V_p$ and $V_s$ to clay content and porosity, clay content can be estimated by inverting Eqs. (2–4). Since compressional velocity and porosity are more readily available, the clay content was estimated from the compressional velocities and porosity values. Here it can be seen that the estimated values of clay content agree very well with the values calculated from standard log analysis. This agreement is so good that the agreement is of the quality that it can be used for lithological identification.

Figure 5:
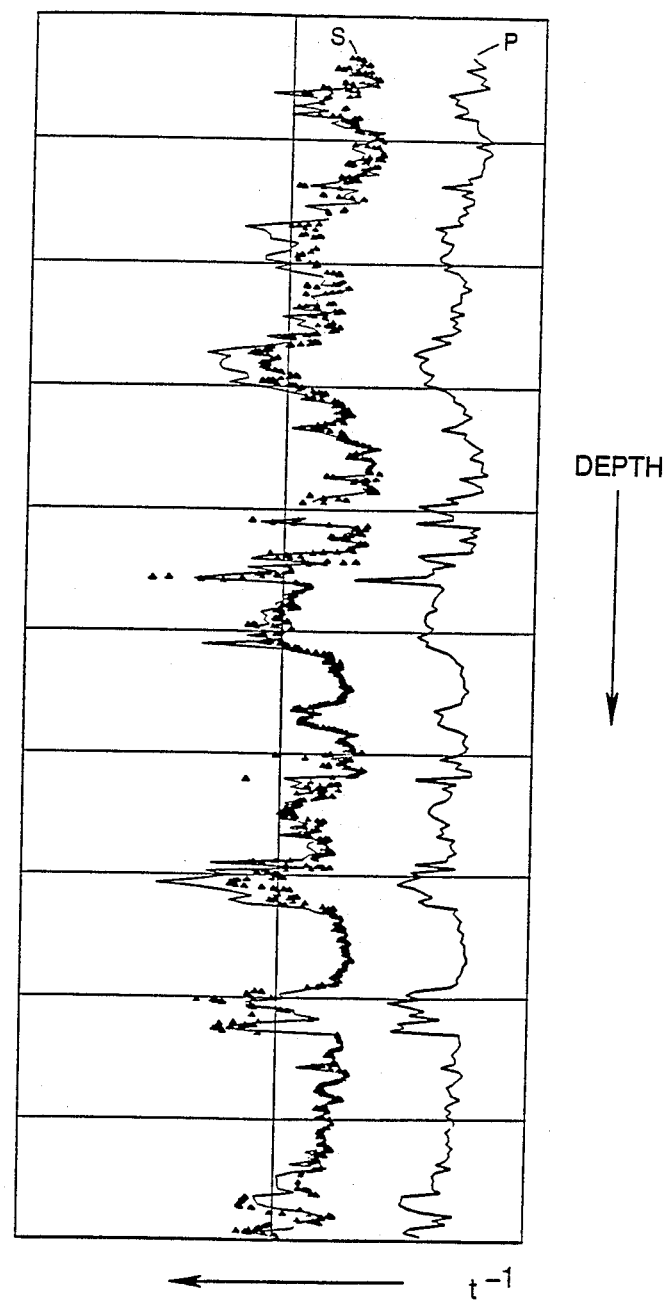
FIG. 5 is a schematic representation of the full wavetrain sonic log data for the remote exploratory well with improved estimates of shear velocity.

FIG. 5 depicts a full wavetrain sonic log obtained for the exploratory well of FIGS. 2 and 3. Indicated in FIG. 5 are re-estimated values for formation shear transit times indicated by triangles using direct in-situ measures of the formation properties porosity $\phi$ and compressional velocity $V_p$ as well as the previously estimated clay content M from FIG. 4. The re-estimated values of shear velocity more closely approximate the direct measured shear velocity than the estimates in FIGS. 2 or 3.

From the example shown above, the procedure for estimating elastic and/or lithological parameters is good, especially in light of the fact that the estimated in-situ formation properties were made using an empirically derived systematic relationship obtained from laboratory measures of samples from an offshore well 300 miles distance from the exploratory well. Coefficients for such empirical systematic relations may be applicable only to particular sedimentary basins common to both the reference and exploratory wells. However, by reestablishing coefficients for a particular sedimentary basin through laboratory velocity measurements and porosity and clay content measurements one can obtain similar empirical systematic relationships for each sedimentary basin. Once such coefficients are determined, one can estimate elastic and/or lithological parameters for other wells, provided at least two formation properties selected from the group, including compressional, shear and bulk velocity as well as porosity and mineralogy content are available.

While the invention has been described with reference to a specific embodiment, the exact nature and scope of the invention is defined in the following claims.

I claim:

1. A method for estimating in-situ formation properties within a selected sedimentary basin, comprising the steps of:
   (a) obtaining empirical systematic relations for formation velocity V variations resulting from variations in formation porosity $\phi$ and mineralogy content M according to:

$$V = V_0(1 + A_1\phi + A_2M)$$

where $V_0$, $A_1$, and $A_2$ are separately determined coefficients;
   (b) obtaining formation samples from at least one reference well essentially within one sedimentary basin and obtaining measures representative of the in-situ formation properties velocity, porosity and mineralogy content from the formation samples;
   (c) performing a regression analysis with the measures of formation properties obtained from the reference well so as to evaluate the coefficients $V_0$, $A_1$ and $A_2$ for the selected sedimentary basin;
   (d) obtaining in-situ measures of at least two formation properties selected from the group including shear wave velocity, compressional wave velocity, porosity, and mineralogy content for an exploratory well essentially within the selected sedimentary basin; and
   (e) inverting the empirical systematic relations of formation property to obtain estimates of the balance of in-situ formation porosity for the exploratory well not obtained in step (d).

2. The method of claim 1 wherein the step (a) further includes obtaining empirical systematic relations for compressional $V_p$, shear $V_s$, and bulk $V_b$ velocities according to:

$$V_p = V_o'(1 + A_1'\phi + A_2'M)$$

$$V_s = V_o''(1 + A_1''\phi + A_2''M)$$

and $$V_b = V_o'''(1 + A_1'''\phi + A_2'''M)$$

where
$V_o'$, $V_o''$, $V_o'''$; $A_1'$, $A_1''$, $A_1'''$, and $A_2'$, $A_2''$, and $A_2'''$ are separately determined coefficients;
$\phi$ = porosity; and
M = mineralogy content.

3. The method of claim 1 wherein the mineralogy content includes the volume, and alternatively, the weight percent of minerals selected from the group including calcite, feldspar, quartz and clay.

4. The method of claim 1 wherein the step of obtaining measures of formation properties for at least one reference well includes the steps of:
   (a) obtaining formation samples from the reference well; and
   (b) determining formation velocities for a plurality of effective pressures and pore fluids.

5. The method of claim 4 further including the step of determining a measure of reliability of the systematic relations to estimate in-situ formation properties by comparing direct measures of the in-situ formation properties with estimates of the in-situ formation properties obtained with the systematic relations.

6. The method of claim 5 further including the step of enhancing the measure of reliability of the systematic relations by iteratively obtaining different sets of systematic relations of the formation properties for varying effective pressures and pore fluids.

7. The method of claim 1 wherein step (c) includes determining porosity and mineralogy content from known shear wave and compressional wave velocities.

8. The method of claim 1 wherein step (c) includes determining the porosity and compressional wave velocity from the measured mineralogy content and shear wave velocity.

9. The method of claim 1 wherein step (c) includes determining porosity and shear wave velocity from the mineralogy content and compressional velocity.

10. The method of claim 1 wherein step (c) includes determining mineralogy content and compressional wave velocity from porosity and shear wave velocity.

11. The method of claim 1 wherein step (c) includes determining mineralogy content and shear wave velocity from porosity and compressional wave velocity.

12. The method of claim 1 wherein step (c) includes the step of determining compressional wave and shear wave velocities from porosity and mineralogy content.

* * * * *